(12) United States Patent
Price

(10) Patent No.: US 7,665,977 B2
(45) Date of Patent: Feb. 23, 2010

(54) STEAM HEATED VULCANIZATION APPARATUS

(76) Inventor: John G. Price, 2733 Gunter Park Dr. West, Montgomery, AL (US) 36109

( * ) Notice: Subject to any disclaimer, the term of this patent is extended or adjusted under 35 U.S.C. 154(b) by 435 days.

(21) Appl. No.: 11/802,962

(22) Filed: May 29, 2007

(65) Prior Publication Data
US 2008/0299241 A1    Dec. 4, 2008

(51) Int. Cl.
*B29C 35/04*    (2006.01)
(52) U.S. Cl. .................. 425/47; 156/583.1; 425/394; 425/403
(58) Field of Classification Search ............... 425/28.1, 425/47, 394, 403, 446; 156/304.6, 502, 583.1
See application file for complete search history.

(56) References Cited

U.S. PATENT DOCUMENTS 2,036,179 A  *  3/1936  MacBrair et al. ............ 425/144
3,487,871 A  *  1/1970  Kanamori ................. 156/304.6
4,543,140 A  *  9/1985  Price .......................... 425/394
4,557,791 A  * 12/1985  Fudickar et al. .......... 156/583.1

* cited by examiner

*Primary Examiner*—James Mackey
(74) *Attorney, Agent, or Firm*—H. Jay Spiegel; Robert L. Haines

(57) ABSTRACT

Disclosed herein is an apparatus for vulcanizing rubber, particularly for vulcanizing the ends of endless rubber belts. The apparatus disclosed herein is a lightweight and portable steam heated vulcanization apparatus which comprises upper and lower platens comprising hollow bodies having a rigid outer wall and a flexible inner wall and adapted to receive steam therein and transmit heat and pressure to a rubber belt placed between the flexible inner walls of the platens. A steam source is connected to the platens for delivery of steam and a plurality of connecting bolts pass through apertures in the platens and the belt material therebetween to align the platens and secure them together so as to apply pressure to the belt in combination with heat for optimal vulcanization.

16 Claims, 4 Drawing Sheets

STEAM HEATED VULCANIZATION APPARATUS

FIELD OF THE INVENTION

This invention relates to a steam vulcanizing apparatus which eliminates the need for heavy and bulky frames or complex hydraulic and pneumatic presses to apply and contain the pressure required for vulcanizing rubber. Utilizing modified steam platens adapted to receive connecting means which pierce the rubber sections being vulcanized, the present invention provides a steam vulcanizing apparatus that is sufficiently portable so as to be easily transported and used in the field for the manufacture or repair of rubber belts.

BACKGROUND OF THE INVENTION

In order to join the two ends of a rubber belt together and in the process provide a strong joint therebetween, it is necessary to provide the proper heat and pressure simultaneously at the region of the joint which heat and pressure, when properly applied, act to vulcanize the rubber and thereby bond the belt ends together to form a joint. Often, in order to strengthen the joint, rubber cement is used as well as the addition of splice rubber so as to ensure that sufficient rubber is present at the region of the joint so as to provide a strong joint.

In the prior art, various methods have been utilized in order to provide heat as well as pressure at the area of the proposed joint. For example, screw jacks, hydraulic cylinders, air cylinders, etc. have been utilized in the prior art to provide the appropriate pressure for vulcanization. Further, in order to provide the proper temperature for vulcanization, electrical heating as well as steam heating have been used. Thus, in known systems, there has always been a problem with coordinating the source of pressurization with the source of heating so as to properly vulcanize the belt ends to form a proper joint.

It is desirable in pressurizing the location where the joint is to be produced to be able to uniformly pressurize the area at a pressure of between 60 and 125 psi. As noted above, one method for pressurizing the region of the splice comprises the use of screw clamps. In order to produce the required surface pressure at the area of the splice using screw clamping, it is necessary to tighten the clamp to a predetermined torque which requires expensive torque-measuring devices with the further expense incurred for paying the operator of such devices. In such an operation, a large number of screw clamps may be necessary so as to properly pressurize the entire surface area, and accordingly, it is a time consuming operation to ensure that each clamp carries its correct load. During the time that the curing of the splice takes place, it is necessary to repeatedly check each clamp so as to ensure that no relaxation of the pressure has occurred. A further problem arises from the fact that the screw clamps may only be placed along the outer edges of the belt, thus necessitating the use of transverse beams of great rigidity so as to evenly spread the pressure created by the torquing-down of the screw clamps across the surface of the splice. In order to provide sufficient rigidity in the beam so as to perform its required function, such a beam must be made quite heavy and accordingly such a beam is quite difficult to handle.

A further means known in the prior art for clamping splices comprises the use of either hydraulic or pneumatic clamps. When such systems are properly used, even surface pressure applied to the belt surfaces at the region of the splice is possible, but in order to utilize this type of clamping procedure, a large variety of additional equipment is required such as pumps, compressors, hydraulic or air cylinders and the necessary hoses and other connections. In one form of air clamping, a pressurized rubber bag is used so as to evenly distribute clamping pressure over the entire surface of the splice area and so as to enable the absorption of any undulations in the surfaces thereof. The major drawback to the use of a rubber bag is that, due to the fact that the region wherein the rubber bag is utilized is also heated to high temperatures, the lifespan of such a rubber bag is extremely limited. Further, replacing such a rubber bag is extremely expensive.

In order to vulcanize the area of the splice within a reasonable time, temperatures on the order of 300° to 360° Fahrenheit must be applied to the splice. The most commonly utilized source of heat in the splicing of rubber belts comprises radiation heating with electrical power. The main drawback to the use of electricity as a source of heat is that the site where the splicing is to take place must be within close proximity of a suitable power supply for the electricity or otherwise a large, expensive mobile electrical generator must be provided. Also, the heaters required to generate the temperatures required for vulcanization require significant voltage and, in most instances, the use of extremely long extension cables are necessary which results in large losses in voltage which thereby lowers the temperatures which may be provided through an electrical source. Thus, the time period for vulcanization may be significantly longer than what is preferred.

As stated hereinabove, a further source of heat utilized in the vulcanization of rubber comprises the use of steam. The main limitation to the use of steam appears to be the requirement for a separate boiler arrangement so as to provide the steam. However, even steam heat requires the application of pressure evenly across the area being vulcanized.

In his previous patent, U.S. Pat. No. 4,543,140, the disclosure of which is incorporated herein by reference, Applicant provided an apparatus and method for vulcanizing rubber belt splices which includes the following features:

(1) A pair of opposed steam sacks are provided, each of which is made of an extremely thin metal skin which metal may preferably be stainless steel. The thickness of the metal skin is on the order of 0.030 inches.

(2) Each steam sack is mounted on a frame device with the frame devices being reciprocable with respect to one another so as to enable adjustment of the spacing between the facing surfaces of the respective steam sacks. Thus, after the two ends of belt which are to be spliced together are placed between the steam sacks, the respective frames may be reciprocated so as to enable the engagement on opposite sides thereof by the opposed steam sacks.

(3) A boiler is provided in conjunction with the present invention which enables water to be boiled to create sufficient steam so as to pressurize the steam sacks to the desired pressure while heating them to the desired temperature simultaneously.

(4) A shut-off valve is provided in the system so that at the completion of the necessary vulcanizing time the pressurized steam may be retained within the steam sacks. The gradual cooling and condensation of the steam causes concurrent reduction in the pressure and temperature at the area of the splice to thereby allow the splice to come to a normal temperature and pressure while avoiding blistering at the region of the splice.

(5) The system includes means for adjusting the pressure of the steam within the steam sacks so as to vary the temperature to which the belt splice is exposed which thereby controls the time of vulcanization. Accordingly, the system may be adjusted to accommodate to differing widths and thicknesses of belts as well as being adjustable to provide differing vulcanization times for belts of similar characteristics.

However, even this apparatus requires the use of a heavy frame confining the steam sacks and belt ends being vulcanized together in order to obtain and maintain the necessary pressure on the relatively thin skin of the steam sacks across the area of the belt being vulcanized.

Since belt structures often require repair on site, it would be advantageous to have a vulcanizing press which is readily portable and easy to use. Thus, there is a need for a lightweight, portable, steam vulcanizing apparatus.

Various prior art devices for vulcanizing belts and similar structures are known. However, they invariably employ electrical heating together with some form of clamping apparatus which, for small applications, may be practical. For example, Serbin, U.S. Pat. No. 3,013,930, discloses an apparatus for connecting overlapped ends of a strip in which pins on an electric heating iron pass through holes in the jaws of a clamp and pierce two layers of material being joined. The pins do not perform any clamping function and are heated by the iron to melt the surrounding areas of the material being joined. The platens of the clamp structure are held closed by a spring and are indirectly heated by the iron.

Ginter, et al., U.S. Pat. No. 4,376,668, discloses an apparatus and method of making v-belts in which an electrically heated iron is clamped around the ends of a belt material in which layers of splice material have been inserted. In one embodiment, nails are inserted through the ends of the belt and splice material to hold the ends together during vulcanization, but the nails provide no clamping function.

German patent DE 2351047 discloses a vulcanizing press having rods between platen uprights which pierce a belt being joined. Electrically heated platens are positioned with the belt member between them. The patent discloses the lower platen as stationary and the upper platen as movable by pressure spindles or hydraulic cylinders. In addition to two uprights at the ends of the platens, the patent discloses several tie rods arranged between them. However, the disclosure of pressure spindles or hydraulic cylinders being used to move the upper platen raises a question as to the purpose of the tie rods. In any event, there is no means disclosed in this patent to permit the use of steam to provide heat or pressure for vulcanization in a portable apparatus. Furthermore, it appears that the pressure spindles or hydraulic cylinders provide the pressure while the tie rods appear to be for purposes of aligning the pieces being vulcanized.

For larger applications where repairs must be completed in the field, it would be preferable to have a steam vulcanizing press which does not require a heavy clamping mechanism.

Accordingly, it is a first object of the present invention to provide a lightweight portable steam vulcanizing apparatus which is simple to operate while being simple in design and assembly.

It is a further object of the present invention to provide a lightweight portable steam vulcanizing device which enables the use of steam so as to provide both pressure and heat for the vulcanization process.

It is a yet further object of the present invention to provide a lightweight portable steam vulcanizing device which enables the cooling of the vulcanized area without the use of additional equipment and while avoiding blistering of the splice.

It is a still further object of the present invention to provide a lightweight portable steam vulcanizing device which enables a smooth transition between the original material and newly vulcanized material for esthetic purposes. It is a still further object of the present invention to provide a lightweight portable steam vulcanizing device which enables the operator thereof to vulcanize a spliced area of a rubber belt with great efficiency and economy.

The foregoing objects are realized by the steam heated vulcanization apparatus of the present invention which comprises upper and lower platens comprising hollow bodies adapted to receive steam therein and transmit heat and pressure to a rubber object placed between the platens. A steam source is connected to the platens for delivery of steam and a plurality of connecting bolts pass through apertures in the platens to align the platens and secure them together so as to apply pressure to the rubber object in combination with heat.

The platens of the steam heated vulcanization apparatus comprise a rigid metal outer plate, a flexible metal inner sheet, spacers between the outer plate and the inner sheet defining a steam chamber, an inlet port releasably connectable to a steam source, and a plurality of apertures through the outer plate and the inner sheet to receive connecting bolts therethrough, the apertures having seal means whereby steam is prevented from escaping from the steam chamber.

These and other objects, aspects and features of the present invention will be better understood from the following specification when read in conjunction with the appended drawing figures.

DESCRIPTION OF THE PREFERRED EMBODIMENTS

Figure 1:
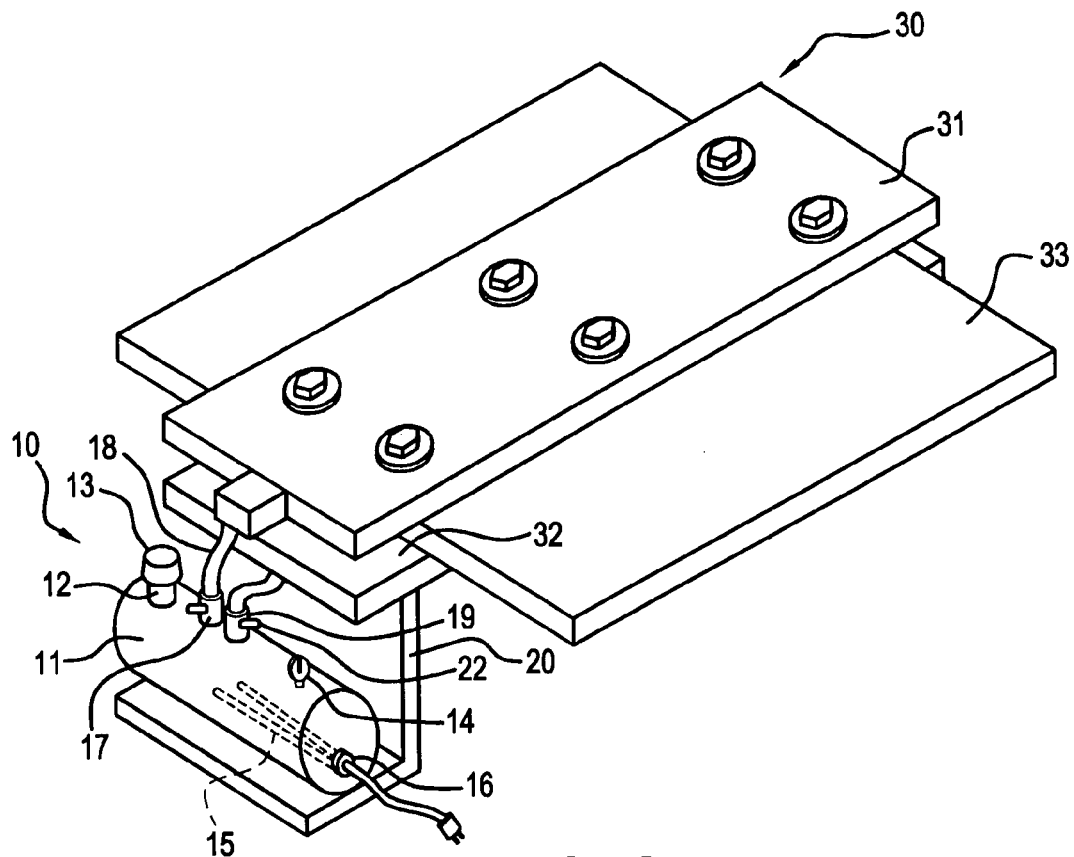
FIG. 1 shows the lightweight, portable steam vulcanizing apparatus of the present invention.
Figure 2:
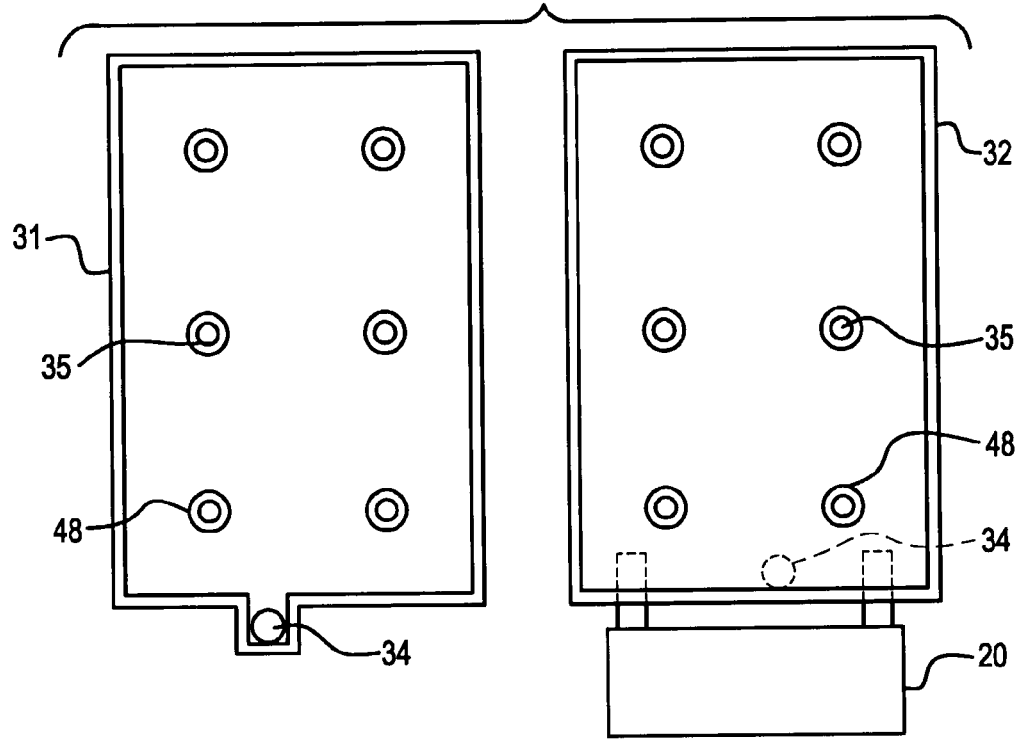
FIG. 2 shows top views of the platens of the vulcanizing apparatus of the present invention.

Referring now to FIG. 1, the apparatus embodying the present invention includes a steam supply system 10 and a vulcanizing apparatus 30. The steam supply system 10 may be provided as an integral element as shown or it may be separate from the vulcanizing apparatus 30.

The steam supply system 10 includes a boiler 11 in which is contained a predetermined amount of water. A filler port 12 including an overpressure safety release valve 13 is provided for introduction of water to the boiler 11. The overpressure safety release valve is calibrated to open at a pressure higher than that required by the vulcanizing apparatus 30 but lower than that which would result in rupture of the boiler 11 or other components of the steam supply system 10 or the vulcanizing apparatus 30. A pressure gauge 14 provides the operator with a visual display of the steam pressure in the boiler 11.

Heat to convert the water to steam is preferably provided by immersible electrically operated calrod heaters 15 within the boiler 11, the heaters 15 being provided with appropriate operator actuated controls as well as a pressure switch 16 to deactivate the heaters 15 at a maximum upper pressure and reactivate them at a minimum lower pressure. For example, if the overpressure safety release valve 13 is set to release when the pressure of steam in the boiler exceeds 80 psi, the calrod pressure switch 16 would be adjusted to respond to upper and lower steam pressures below 80 psi. In this manner the steam supply system 10 is adjustable to provide steam at variable temperatures and pressures depending on the thickness of the material being vulcanized. Alternatively, for those locations where access to electricity may be limited, the boiler may be provided with a portable propane burner to heat the water and produce steam, such boilers are well known in the art to be capable of raising steam at 100 psi in approximately 5 minutes. In that case, the pressure switch 16 may operate the propane valve and igniter to control the flow of propane to the burner and its ignition based on the pressure sensed within the boiler 11.

To convey steam from the boiler 11 to the vulcanizing apparatus 30, the boiler 11 is provided with two steam ports 17. Communication between the steam ports 17 and the vulcanizing apparatus 30 is provided by flexible steam lines 18 which are preferably stainless steel and Teflon® braided hose. However, hoses of other materials capable of withstanding the temperature and pressure of the steam may be used. Releasable connectors 19 of any type commonly used with steam lines are provided at each end of the steam lines 18 to connect with corresponding connectors at the steam ports 17 and the vulcanizing apparatus 30. If desired, shut-off valves 22 may be included as part of the steam ports 17 or the steam line connectors 19.

The steam supply system 10 is shown supported on a bracket 20 depending from the vulcanizing apparatus 30. However, placement of the steam supply system 10 is not so limited and the steam supply system 10 may be placed anywhere in close proximity so long as it does not interfere with the operation of the vulcanizing apparatus 30.

The vulcanizing apparatus 30 comprises an upper platen 31 and a lower platen 32 between which is disposed a rubber belt 33 or other object to be vulcanized. Upper and lower platens 31 and 32 are each provided with a stem inlet port 34 to which are releasably connectable the steam lines 18. Upper and lower platens are preferably rectangular in plan with the steam inlet ports located at one end thereof. Each platen has a plurality of regularly spaced apertures 35 which pass completely through the thickness of the platen, the apertures 35 being positioned at the same locations on the upper platen 31 as on the lower platen 32 so that, when the vulcanizing apparatus is in use, the apertures 35 of each platen are in alignment to enable insertion of connecting bolts 36 through both platens 31 and 32 and through the rubber belt 33 therebetween.

Figure 3:
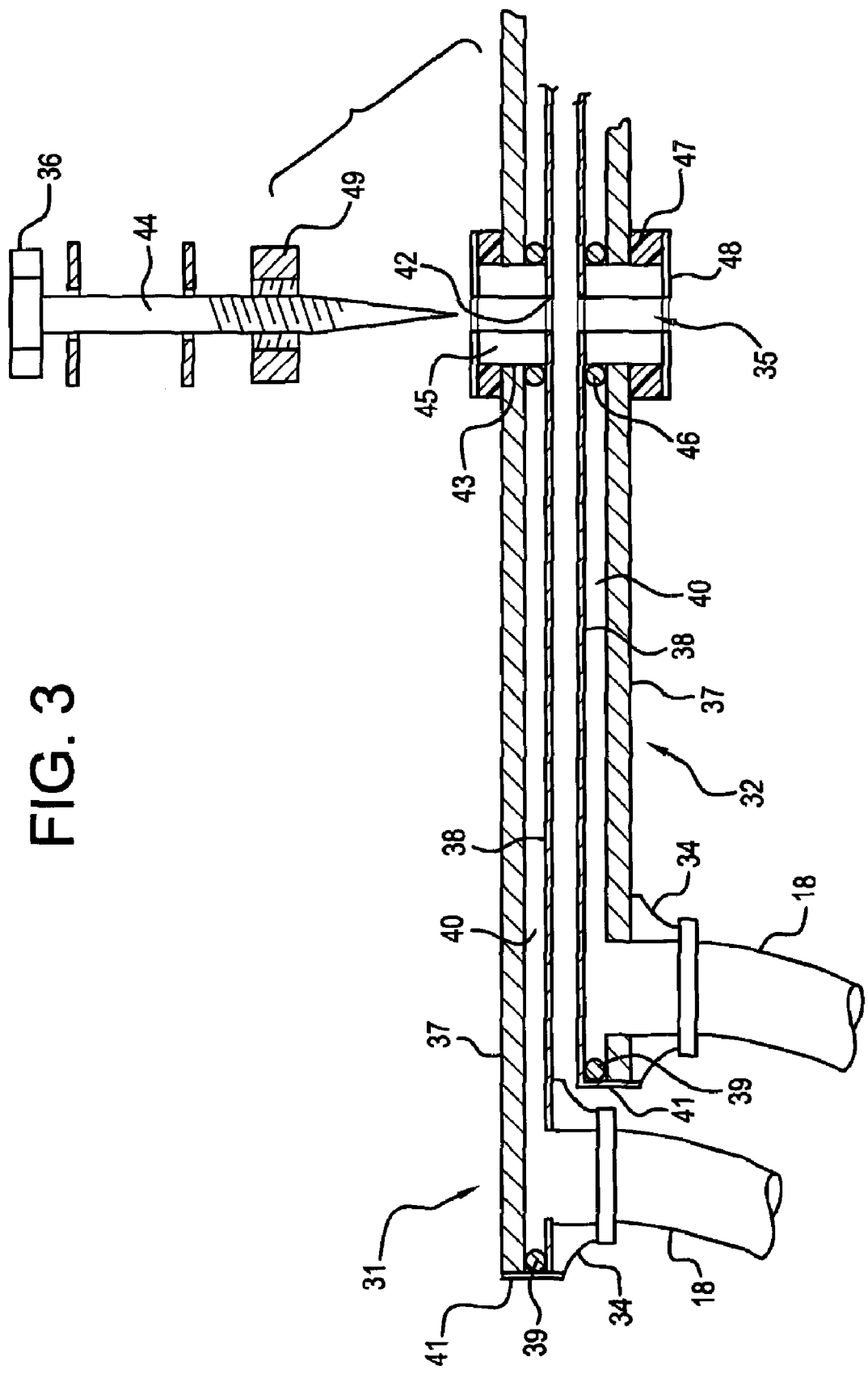
FIG. 3 shows a partial cross-section of the platens and connecting bolt and apertures according to the present invention.
Figure 4:
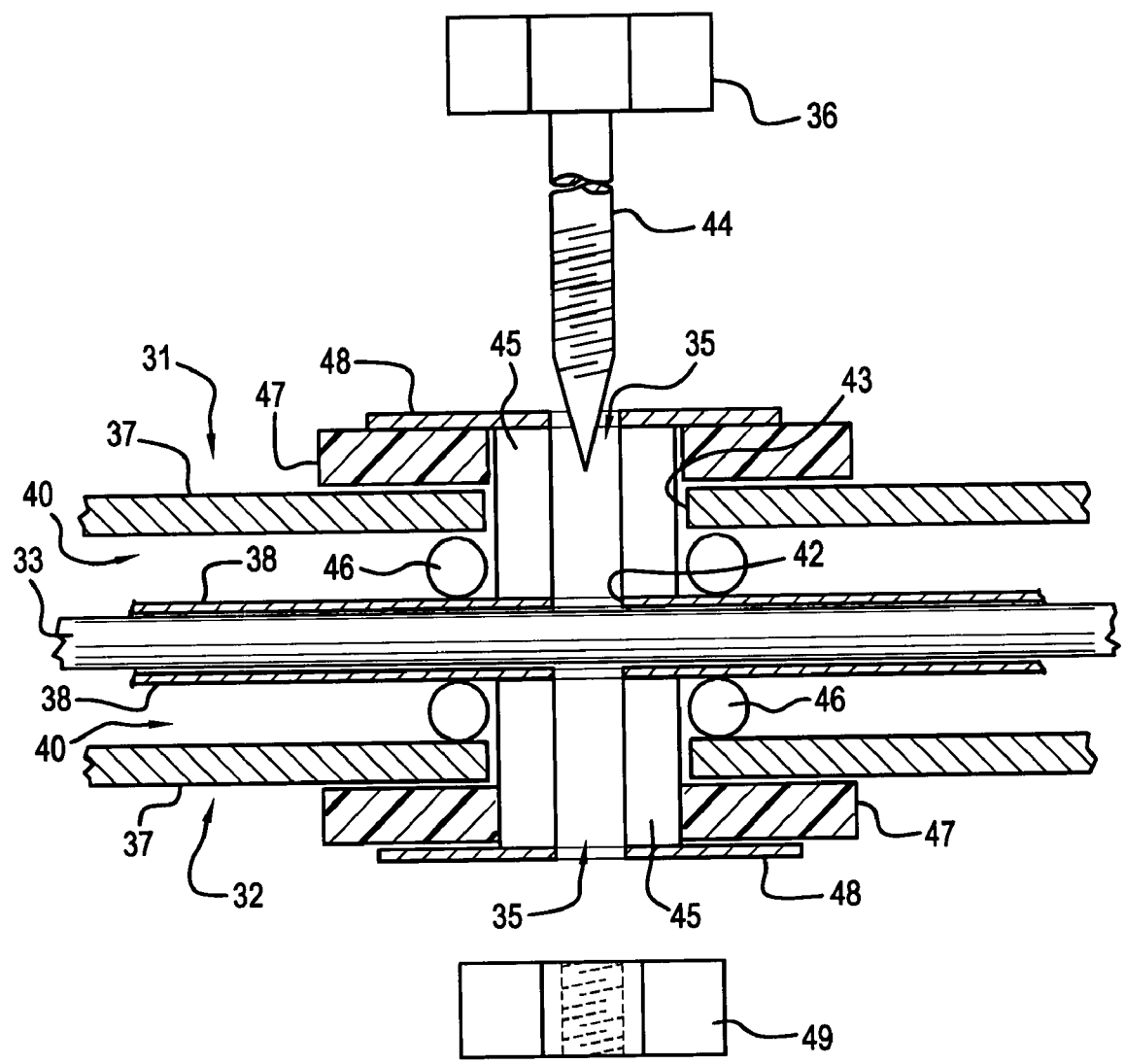
FIG. 4 shows a detailed cross-section of the aperture and connecting bolt combination of the present invention.

With reference now to FIGS. 3 and 4, the specific structural details of the platens 31 and 32 will be explained, it being understood that the specific details of the upper and lower platens 31 and 32 are substantially identical.

As seen in FIG. 3, each platen 31 and 32 includes an outer rigid plate 37 and an inner substantially flexible sheet 38 spaced apart from each other about 3/16" by rod spacers 39 so as to maintain a steam chamber 40 within each platen 31 and 32. Rod spacers 39 extend around the entire periphery of the platens 31 and 32 and, preferably, outer plate 37 and inner sheet 38 are welded to opposite sides of rod spacers 39 to form a sealed peripheral wall. Alternatively, an outer wall 41 may be welded over the edges of outer plate 37 and inner sheet 38 in which case rod spacers 39 may be simply placed inward of the wall as an extra support between outer plate 37 and inner sheet 38, or rod spacers 39 may be eliminated.

The materials used to manufacture the vulcanizing apparatus 30 may be any that can withstand the heat, pressure and moisture generated by steam. However, stainless steel is preferred. Outer rigid plate 37 is preferably 3/16" to 1/2" stainless steel plate and provides necessary rigidity and strength to the platens 31 and 32. In contrast, inner sheet 38 is preferably 20-30 gauge stainless steel sheet, more preferably 24-28 gauge, providing a diaphragm-like, thin, flexible covering for even thermal transfer of heat from steam chamber 40 to the belt 33. In addition, the flexible nature of inner sheet 38 allows it to closely conform to the belt 33 due to force exerted by steam under pressure in steam chamber 40.

As noted previously, apertures 35 in platens 31 and 32 permit the platens to be clamped together on each side of belt 33 by means of connecting bolts 36 which are received through aligned apertures 35 and pass through the belt 33 and nuts 49 which are threadably tightenable onto the exposed ends of bolts 36. In order to maintain a secure steam seal, apertures 35 have a particular structure which is shown in detail in FIG. 4.

Each aperture 35 comprises a first hole 42, having a first diameter, in inner sheet 38 and a second hole 43, having a second diameter, in outer plate 37. The second diameter is larger than the first diameter and the first diameter corresponds substantially to the diameter of the shaft 44 of connecting bolts 36. Secured to the inner surface of inner sheet 38, preferably by welding, and coaxial with first hole 42 and extending outward therefrom through second hole 43 in outer plate 37 is a hollow cylinder 45. The inner diameter of cylinder 45 corresponds to the diameter of first hole 42 and, therefore, to the diameter of bolt shaft 44, while the outer diameter of cylinder 45 corresponds to the diameter of second hole 43. A spacer ring 46 is disposed about cylinder 35 between outer plate 37 and inner sheet 38 to maintain the relative positions of outer plate 37 and inner sheet 38 when steam chamber 40 is devoid of steam. To provide a steam seal around cylinder 45 where it exits through second hole 43, a sealing ring 47 of resilient, thermally resistant material is disposed around cylinder 45 on the outer surface of outer plate 37 and is held in place by a flange 48 secured to the outer end of cylinder 45. Flange 48 extends peripherally outward from cylinder 45 a sufficient distance to prevent resilient sealing ring 47 from working free. It is preferred that the fit of resilient sealing ring 47 around cylinder 45 and against outer plate 37 be snug to ensure a good seal against steam loss through second hole 43 around the outside of cylinder 45. However, it is noted that the introduction of steam pressure into steam chamber 40 will cause outer plate 37 to press against resilient sealing ring 47 thereby compressing sealing ring 47 between plate 37 and flange 48 resulting in a lateral elongation of the material of sealing ring 47 against the outside of cylinder 45 thereby improving the sealing effect of resilient sealing ring 47.

Figure 5:
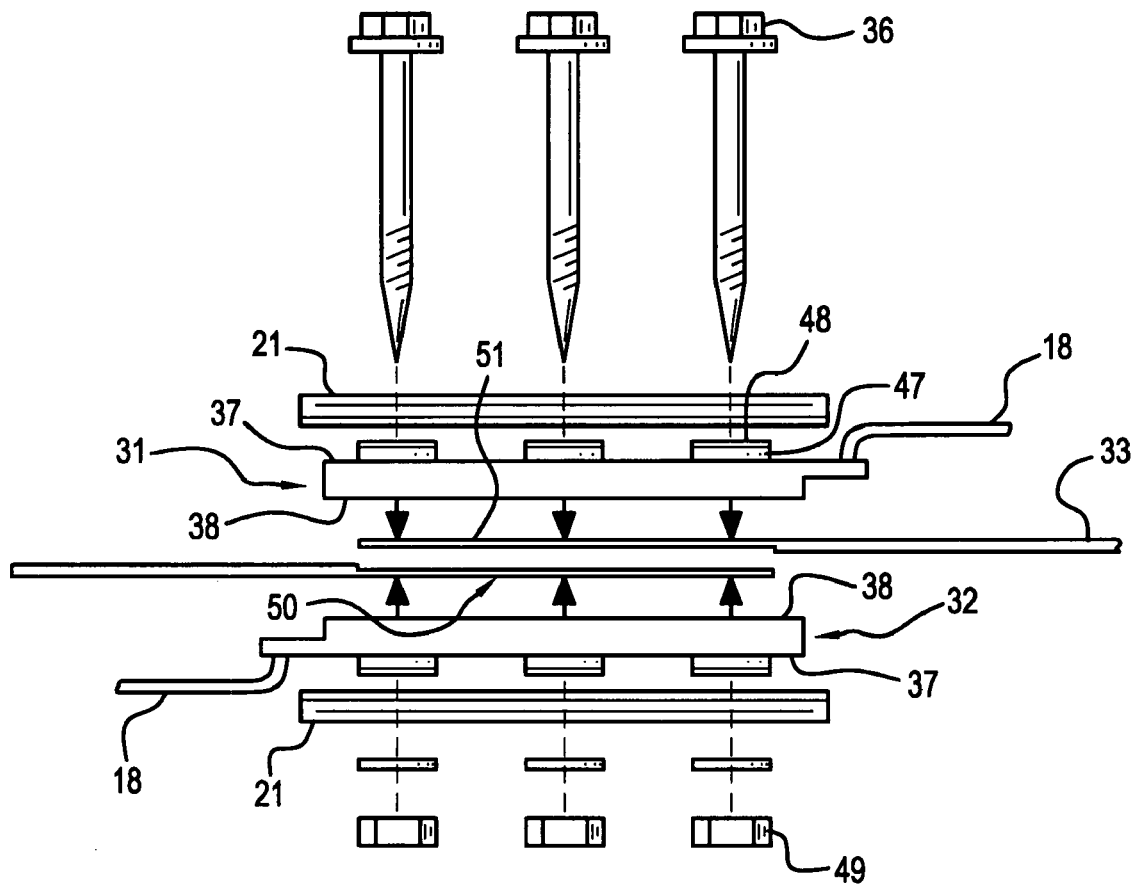
FIG. 5 shows an exploded view of the vulcanizing apparatus of the present invention.

With the apparatus in accordance with the present invention having been described, the operation thereof will now be explained. First, with reference to FIG. 5, it is seen that a belt 33 is formed with a splice area 50 comprising thin sections 51 immediately adjacent the ends of the belt 33. These thin sections 51 are preferably equal to one half the thickness of the belt 33. As shown in FIG. 5, the platens 31 and 32 are arranged with the inner sheets 38 in facing relationship and the belt 33 splice area 50 is placed between the platens 31 and 32 with the thin sections 51 thereof aligned in stacked relationship with one another to form a half-lap joint. If desired, rubber cement may be applied between the thin sections 51 so as to enhance the vulcanization thereof. Connecting bolts 36 are inserted through the aligned apertures 35 and the aligned thin belt sections 51, and nuts 49 are threadably attached to the ends of bolts 36 extending from lower platen 32. Nuts 49 are tightened to draw the platens together against belt 33 with outer plate 37 serving to spread compression force evenly across the platens. If desired, thermal covers 21 may be applied over outer plates 37 of platens 31 and 32 as a safety measure and to reduce thermal loss through outer plates 37.

The following table relates the pressure of steam with its temperature at that pressure:

TABLE 1

| PRESSURE OF STEAM IN PSI | TEMPERATURE OF STEAM IN F.° |
|---|---|
| 60 | 307 |
| 70 | 316 |
| 80 | 324 |
| 90 | 331 |
| 100 | 338 |
| 110 | 344 |
| 125 | 352 |

As may be seen from Table 1, as the pressure of the steam increases, the temperature of the steam correspondingly increases and vice versa in a predictable relationship. As is known to those skilled in the art, as the pressure and temperature of the steam are increased, the vulcanization time is decreased for belts of equal configuration. It may be desirable to increase the temperature and pressure of the steam in situations where the belt is thicker than usual, or when it is desired to reduce the vulcanization time in belts of normal thickness, which is on the order of one-fourth to one-half inch thickness.

Now, in step by step fashion, the operation of the present invention will be described:

(1) The nuts 49 are loosened to as to enable removal of bolts 36 and separation of platens 31 and 32 a sufficient distance so as to enable the insertion therebetween of the thin belt sections 51 in their stacked relationship. After the thin sections 51 of belt 33 are suitably positioned, the bolts 36 are reinserted, piercing the stacked belt sections 51 and the nuts 49 are re-applied and tightened so as to firmly engage the platens 31 and 32 on respective sides of the belt 33 at the area of the splice.

(2) The steam supply system 10 is connected to platens 31 and 32 by steam lines 18 and is activated by switching on the calrod heaters 15 or other heating means as is well known by those skilled in the art. If desired, a steam coil may be included in the lines 18 so as to enable the super heating of the steam formed through the boiling of the water. With the valves 22 in the closed position, the over pressure release valve 13 is adjusted as is well known to those skilled in the art so that it opens when the pressure in the boiler 11 exceeds the desired operating pressure for the system 10. For example, if it is desired that the system operate at 100 psi of steam pressure, the over pressure release valve 13 is set so that if the pressure in the boiler 11 exceeds 100 psi, the valve 13 will open enabling the blowing-off of the excess pressure therethrough. At the same time, the upper and lower pressure limits for the calrod heaters are set on the calrod pressure switch 16.

(3) After the over pressure release valve 13 has been set at the desired operating level, and the calrod pressure switch 16 has been set, the valves 22 are opened to thereby enable steam to be supplied through the steam lines 18 through the steam inlet ports 34 into the steam chamber 40 of the platens 31 and 32 where the steam pressurizes the platens 31 and 32 causing the diaphragm-like inner sheet 38 of each platen to press against the adjacent surface of the belt 33 in the area of the splice. The pressure of the steam in the steam chamber 40 also presses against the outer plate forcing it against the resilient sealing rings 47 to seal around the cylinders 45. The combination of the steam pressure in the steam chamber 40 acting against the inner sheet 38 and the connecting bolts 36 being tightened against flanges 48 and cylinders 45 on both sides of the belt 33 to clamp the belt in place between the platens creates sufficient compression against the belt 33 in the area of the splice for vulcanization such that heavy and bulky beams or clamping plates, complex hydraulic or pneumatic clamps, and the like are not required. In addition, spacing the connecting bolts 36 evenly across the area of the splice results in an even application of pressure across the area which is not possible with apparatus where clamps are limited to the outer periphery. Although the location of the apertures 35 and, consequently, the placement of the connecting bolts may vary depending on the material and thickness of the belt 33 being vulcanized, a location for the apertures in a rectangular arrangement of about 8"-10", preferably 9", on center allows for a steam pressure of up to about 120 psi, which, by Table 1, corresponds to a temperature of about 350° F. and is suitable for most applications.

(4) After the steam chambers 40 in each platen 31 and 32 have been filled with steam and are pressurized at the desired pressure, the inlet valves 22 may be closed so as to isolate the steam within the steam chambers 40.

(5) The steam may be isolated within the steam chambers 40 through closing of the valves 22 at the beginning of the vulcanizing process or if desired, at the end of the vulcanizing process. If it is desired to isolate the steam within the steam chambers 40 at the conclusion of the vulcanizing process, the gradual cooling of the steam will result in gradual cooling and reduction in pressure at the area of the splice to thereby enable the splice to come to a normal room temperature and pressure without any blistering taking place.

(6) At the conclusion of the vulcanization process, remaining pressure is released from the steam chambers 40 either through valves 22 or through simple release valves provided on platens 31 and 32. Connecting bolts 36 are released and removed and the platens 31 and 32 are separated to permit removal of the belt 33. It is noted that heat absorbed by the shafts 44 of connecting bolts 36 will be transmitted to the edges of the holes made in the belt 33 by connecting bolts 36 resulting in a vulcanized wall to those holes. As such, the holes left in the belt 33 by the connecting bolts 36 may be left as they are without any effect on the performance of the belt or they may be filled by a cold vulcanization process.

In an alternative embodiment particularly suitable for portable and/or field use, the vulcanizing apparatus 30, as described, is positioned at a slight incline relative to the longitudinal axis such that the steam supply system 10 is lowermost. The slight incline permits condensation to return from the steam chambers 40 to the boiler.

Steam generated in the boiler 11 passes through steam lines 18 and steam inlet ports 34 into the steam chamber 40 of platens 31 and 32 thereby pressurizing the platens. Upon entering the steam chambers 40, the steam gives up its heat to the platens 31 and 32 and condenses inside the chambers 40. Positioning the apparatus 30 at an incline with the boiler 11 at the lower end allows the condensation to flow downward back to the boiler 11 while fresh steam flows upward. Because the generation of steam and recycling of condensation is continuous, valves 22 are not necessary. The steam lines 18 are preferably of sufficient diameter, such as ¾", to facilitate the simultaneous flow or steam and condensation in opposite directions. Furthermore, locating the steam inlet ports 34 on the underside of each platen 31 and 32 at the lower inclined end as shown in FIG. 1 facilitates the return of condensation to the boiler 11 as there are no internal shoulders or fittings within steam chambers 40 to interfere with the flow of condensation.

In operation, the platens 31 and 32 and belt sections 51 are assembled as described and the apparatus 30 positioned at an incline with the steam supply system 10 lowermost. Because condensed steam is continuously recycled from the steam chambers 40 to the boiler 11 through steam lines 18 for reheating, the volume of water required in the boiler is small such that steam will form soon after the heaters 15 are switched on. Steam generated in the boiler 11 passes through the steam lines 18 into the steam chambers 40 and pressurizes the platens 31 and 32 as previously described. Condensed steam flows back to the boiler 11 through steam lines 18 and is re-heated in a continuous process whereby the desired temperature and pressure, preferably 316° F. at 70 psi, are maintained for the length of the vulcanization process. At the conclusion of the vulcanization process, the heaters 15 are switched off and the apparatus 30 is allowed to cool. As the temperature and pressure fall, the steam condenses and flows back to the boiler 11 at which time the platens 31 and 32 may be released and the belt 33 removed as previously described.

Figure 6:
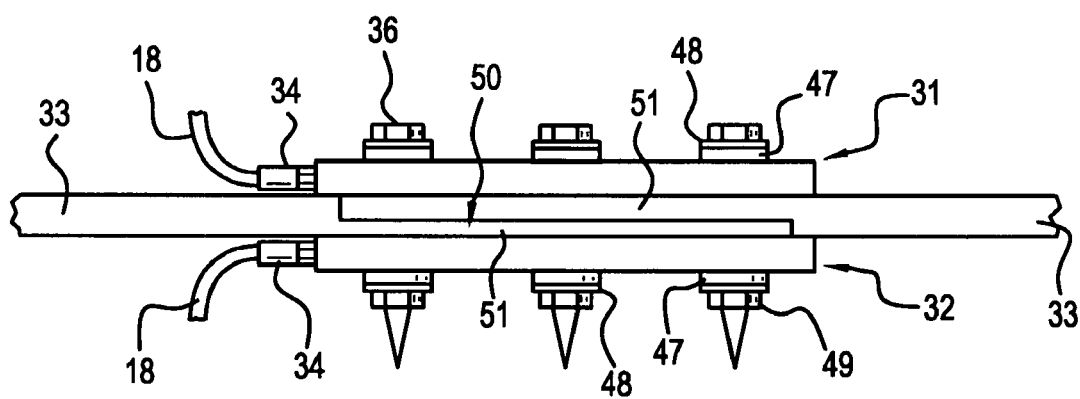
FIG. 6 shows a side view of the vulcanizing platens and belt portions connected together ready for vulcanization.

The operation of the present invention has been described hereinabove with reference to, in particular, FIG. 1 and FIGS. 5 and 6. As stated hereinabove, the preferred material for the vulcanizing apparatus, particularly the outer rigid plate 37 and the inner flexible sheet 38 are stainless steel at a thickness of approximately 3/16" to 1/2" and 0.012 to 0.035 inch, respectively. While this is the preferred configuration, it is noted that as long as the outer plate has sufficient rigidity to withstand excessive flexing while the inner sheet is sufficiently thin so as to be resilient and so as to enable the rapid transmission of the heat from the steam therethrough to the belt, any thickness and material fulfilling these criteria would be sufficient.

It is to be stressed that one of the main aspects of the present invention lies in the fact that steam is an ideal fluid for the heating and pressurizing of a splice in a rubber belt which is being vulcanized thereby. Again, this is because the ideal circumstances for the vulcanization of rubber are pressures between 60 and 125 psi and temperatures of between 300° and 350° F. In this regard, steam is unique because between 60 psi and 125 psi, its temperature ranges between 307° F. and 352° F. Accordingly, applicant has taken advantage of this fact to devise a system and method of operation thereof which ideally takes advantage of these characteristics of steam so as to efficiently vulcanize rubber belt splices.

It is further noted that, in order to make the present invention quite portable in nature, it is desirable that heavy and bulky beams, plates, hydraulic, pneumatic and other clamp or pressure applying mechanisms be eliminated. By fabricating the platens with a rigid outer side and a flexible inner side and using connecting bolts that pass through the platens and the belt being vulcanized, it is possible to use the steam pressure pushing against the rigid outer side to press the flexible inner side against the belt and provide sufficient pressure for vulcanization. Although the bolts 36 passing through the belt 33 and the platens 31 and 32 may apply a certain amount of pressure, their primary purpose is to secure the platens 31 and 32 together on either side of the splice area 50 and prevent steam pressure pushing against flexible inner sheet 38 from pushing the platens 31 and 32 apart. Without the bolts 36, the steam pressure will cause the inner sheet 38 to bow outward and pressure application against belt 33 is reduced and uneven. In contrast, bolts 36 apply pressure both through the cylinders 45 and rigid outer plate 37 through the flanges 48 and resilient sealing rings 47 to hold the platens 31 and 32 together in a secure assembly such that the rigid outer plates 37 provide fixed outer walls on both sides of the belt 33 which are prevented from separating. Accordingly all of the steam pressure is directed with even force across inner flexible sheets 38 against the belt 33. One distinct advantage of the present invention lies in the fact that the operator is only required to have one tool, to wit, a wrench for dogging down the nuts 49 about the bolts 36.

Preferably, as shown in the drawings, the steam is simultaneously introduced into the upper platen 31 and the lower platen 32, the platens being connected to the steam supply system 10 in parallel. If desired, however, the platens 31 and 32 may be connected to the steam supply system in series with the boiler having one steam outlet which, preferably, connects through a steam line to the upper platen 31 and a connecting line between upper platen 31 and lower platen 32 for steam to flow from one platen to the other.

The present invention has been described in relation to a preferred embodiment thereof. One of ordinary skill in the art, after reading the foregoing specification, may be able to affect various changes, substitutions of equivalence, modifications and other alterations without departing from the overall intent and scope of the inventive concepts disclosed herein. It is therefore intended that the invention described herein only be limited by the scope of the following claims.

I claim:

1. A steam heated vulcanization apparatus comprising:
   upper and lower platens comprising hollow bodies adapted to receive steam therein and transmit heat to a rubber object therebetween and having a plurality of apertures therethrough at regular intervals across said platens to receive connecting bolts;
   a steam source connected to said platens for delivery of steam thereto;
   a plurality of connecting bolts adapted to pass through said apertures and said rubber object thereby aligning said upper and lower platens, said bolts having securing means whereby said bolts are tightened to draw said platens together and apply pressure to said rubber object in combination with heat;
   whereby said rubber object is treated for vulcanization.

2. The steam heated vulcanization apparatus of claim 1 wherein said upper and lower platens each comprise an outer rigid plate and an inner flexible sheet, said outer plate and said inner flexible sheet held in spaced apart relationship whereby a steam chamber is provided therebetween.

3. The steam heated vulcanization apparatus of claim 2 wherein said apertures are located in a rectangular arrangement corresponding to 8 to 10 inches on center.

4. The steam heated vulcanization apparatus of claim 3 wherein said upper and lower platens further comprise hollow cylinders provided at each aperture and adapted to receive said bolts therethrough, said cylinders being welded at one end thereof to said flexible sheet whereby the interior of each cylinder corresponds to an aperture in said flexible sheet, the opposite ends of said cylinders passing through corresponding apertures in said rigid plate.

5. The steam vulcanization apparatus of claim 4 further comprising spacers surrounding said cylinders between said rigid plate and said flexible sheet.

6. The steam heated vulcanization apparatus of claim 5 further comprising seal means surrounding said cylinders on the outer surface of said rigid plate.

7. The steam heated vulcanization apparatus of claim 6 wherein said seal means comprises a flange extending peripherally about the outer end of each cylinder and a resiliently compressible ring disposed about said cylinder between said flange and said rigid plate.

8. The steam heated vulcanization apparatus of claim 2 further comprising a thermal cover removably positionable over the outer surface of said rigid plate.

9. The steam heated vulcanization apparatus of claim 2 wherein said steam source comprises a boiler having electrically operated heating means, a filler port with overpressure release means and steam ports with means to connect said steam ports to said steam chambers of said platens.

10. The steam heated vulcanization apparatus of claim 7 wherein said rigid plate and said flexible sheet are stainless steel.

11. The steam heated vulcanization apparatus of claim 10 further comprising spacers disposed between said rigid plate and said flexible sheet about the periphery of said platens.

12. A platen for a steam heated vulcanization apparatus, said platen comprising:
 a rigid metal outer plate;
 a flexible metal inner sheet;
 spacing means disposed between said outer plate and said inner sheet whereby a steam chamber is defined therebetween;
 an inlet port releasably connectable to a steam source whereby steam is introducible to said steam chamber; and
 a plurality of apertures in regular arrangement through said outer plate and said inner sheet adapted to receive connecting bolts therethrough, said apertures having seal means whereby steam is prevented from escaping from said steam chamber.

13. The platen of claim 12 wherein said seal means comprises hollow cylinders at each aperture, an inner end of each cylinder being securely fastened to said inner sheet such that said aperture therein communicates with the hollow center of said cylinder, an outer end of said cylinder passing through a corresponding aperture in said outer plate, a spacer ring disposed about said cylinder between said outer plate and said inner sheet, a resilient ring disposed about said cylinder on the outer surface of said outer plate, and a flange extending peripherally about the outer end of said cylinder over said resilient ring, whereby said resilient ring is confined between said flange and said outer plate over said aperture in said outer plate.

14. The platen of claim 13 further comprising a thermal cover removably disposable over said outer plate.

15. The platen of claim 13 further comprising a plurality of connecting bolts adapted to be received through said apertures and said cylinders whereby two platens are securable together with said inner sheets in a facing relationship to confine a rubber body to be vulcanized therebetween, said connecting bolts passing through said rubber body and having tightening means thereon whereby said bolts apply pressure to said platens and said rubber body disposed therebetween.

16. The platen of claim 15 wherein said apertures are located in a rectangular pattern of 8 to 10 inches on center.

\* \* \* \* \*